2,912,307
Patented Nov. 10, 1959

2,912,307

PYROLYSIS OF THIONYL TETRAFLUORIDE

William Joseph Middleton, Claymont, Del., assignor to E. I. du Pont de Nemours and Company, Wilmington, Del., a corporation of Delaware No Drawing. Application July 26, 1957
Serial No. 674,281

4 Claims. (Cl. 23—203)

This invention relates to a new process for preparing compounds containing sulfur and fluorine. In particular, it relates to a process for preparing sulfur hexafluoride ($SF_6$) and sulfuryl fluoride ($SO_2F_2$).

Sulfur hexafluoride has desirable physical and chemical characteristics and outstanding electrical properties. It is of commercial significance as a gaseous dielectric, particularly for use in transformers. Sulfuryl fluoride has shown utility as a structural space fumigant [Stewart, J. Econ. Entomol. 50, 7–11 (1957)].

Fluorides which contain hexavalent sulfur have been prepared heretofore by processes which require the use of elemental fluorine. Variations have also been tried in which active inorganic fluorides, for example, silver difluoride or cobalt trifluoride, have been substituted for elemental fluorine. Electrolytic processes which require anhydrous hydrogen fluoride have been suggested. Sulfuryl fluoride has been prepared by decomposition of alkali metal fluorosulfonates and by reaction of sulfur dioxide with silver fluoride. These processes are difficult to operate and usually result in the formation of complex mixtures of various sulfur fluorides from which the desirable individual components are difficult to isolate in the pure state.

The novel process of the invention is the pyrolysis or thermal decomposition of thionyl tetrafluoride in a reaction zone held at a temperature of at least about 450° C. to produce sulfuryl fluoride and sulfur hexafluoride. At this temperature the thionyl tetrafluoride, $SOF_4$, begins to be disproportionate to sulfur hexafluoride and sulfuryl fluoride. The reaction may be represented stoichiometrically by the equation:

$$2SOF_4 \rightarrow SF_6 + SO_2F_2$$

In the operation of the process, there is only one reactant present initially in the reaction zone. Except for non-reactive diluent gases, such as helium or nitrogen, whose use in the process is optional, there are present during the reaction at most three compounds, that is, thionyl tetrafluoride and its disproportionation products, sulfur hexafluoride and sulfuryl fluoride. In actual operation the process is carried substantially to completion at which stage there are present primarily only the compounds resulting from the disproportionation.

The operational variables which are important in the process of the invention are temperature, pressure and time. These variables are interrelated and depend to some extent on whether the process is conducted in a batch or continuous operation. Either method of operation is acceptable although a continuous method of pyrolysis is generally preferable for economic reasons.

Although disproportionation of thionyl tetrafluoride begins at about 450° C., higher conversions are obtained at higher temperatures. Consequently the reaction will generally be conducted between about 450° C. and 2000° C. or even higher. The range of 500°–1500° C. is broadly preferred for maximum efficiency of operation in either a batch or continuous flow process. The use of excessively high temperatures does not provide any advantages.

The pressure employed in the operation of the process can be atmospheric, subatmospheric or superatmospheric. In a batch process the pressure is generally autogenous and is also usually superatmospheric. The pressure employed is not critical but will ordinarily lie between about 50 atmospheres and 5000 atmospheres. The preferred range for a batch process lies between about 100 atmospheres and 4000 atmospheres. In a continuous flow process, the pressure employed is generally (and preferably) atmospheric although it can be varied to meet the requirements for most efficient and economic operation. The preferred pressure will, therefore, be dependent on the type of process employed, that is, whether batch or continuous.

The pyrolysis period in a batch process may vary from an hour or less to several days. The preferred time lies between about 1 hour and about 12 hours. In a continuous flow system, contact time in the pyrolysis zone will vary from as short as about 0.001 second or shorter to as long as 5–10 minutes or longer. The normal time of contact in a continuous flow system is from about 0.1 second to about 60 seconds.

Since the temperature, pressure and time of reaction are interrelated variables in conducting the process of the invention, each of these variables can be adjusted to produce maximum results. Generally, when temperatures in the low ranges are employed, it is preferable to conduct the pyrolysis under superatmospheric pressure and/or for longer periods; when high temperatures are employed, good conversions are obtained at atmospheric or subatmospheric pressures.

In a continuous flow system, the crude reaction mixture can be recycled through the reaction zone to obtain increased conversion to the desired products. Optionally, the unreacted thionyl tetrafluoride can be removed from the reaction products and recycled through the reaction zone.

The energy necessary for the pyrolysis can be supplied by any conventional method. It can be supplied, for example, by direct external heating, by internal heat from a tungsten filament heated by passage of an electrical current, by spark or by arc discharge. Variations in procedure for supplying the necessary energy for pyrolysis are well recognized in the art.

The reaction vessels, which encompass the reaction zone, are preferably fabricated to withstand the pressures developed in the reaction and are resistant to corrosion by active fluorine compounds. They can be fabricated, for example, from stainless steel, nickel, borosilicate glass or platinum.

The reaction must necessarily be carried out in a closed system and under substantially anhydrous conditions to avoid side reactions which can occur with water, if present, at the temperatures and pressures employed. The reaction zone can be packed with non-reactive material in the form of aggregates, pellets, rings and the like to increase the rate of heat transfer to the thionyl tetrafluoride and thereby increase the rate of conversion to sulfur hexafluoride and sulfuryl fluoride. Preferably no carbon or carbonaceous materials with which the fluorides of sulfur can react, should be present particularly when the temperature used is 900° C. or above. The reaction zone is preferably freed of air or oxygen by flushing with an inert gas, for example, nitrogen, or by evacuating to a low pressure prior to charging with thionyl tetrafluoride.

Thionyl tetrafluoride, used as the reactant in the process of the invention, can be obtained by methods described in the literature [Dudley, Cady and Eggers, J. Am. Chem. Soc. 78, 1553–7 (1956)]. It can be used in the pure state or it can be used with a non-reactive gaseous diluent, for example, nitrogen or helium.

The products of the pyrolysis can be separated by fractional distillation, by fractional condensation or by a combination of these methods. Fractional distillation under pressure is a convenient method of separation. Since substantially all of the thionyl tetrafluoride is pyrolyzed in the process of the invention, the problem of separation and purification of the two components of the reaction is comparatively simple.

The process of the invention is illustrated in the following examples in which parts are given by weight.

*Example I*

Thionyl tetrafluoride was condensed in a trap cooled in solid carbon dioxide-acetone mixture. Approximately 4 parts of the liquid thionyl tetrafluoride was sealed in a platinum pressure vessel which had previously been flushed with nitrogen and which was then heated at 650° C. for 3 hours at 3,000 atmospheres' pressure. The tube was cooled, opened and the volatile reaction products were collected in glass receivers (cooled with liquid nitrogen). The nuclear magnetic resonance spectrum of the products of the reaction showed that they consisted of equal parts of sulfur hexafluoride and sulfuryl fluoride. No thionyl tetrafluoride remained in the reaction products.

Example I illustrates the pyrolysis of thionyl tetrafluoride by a batch process. Pyrolysis can be effected by the above process at temperatures of from 450° C. up to about 1500° C. or higher, and at autogenous pressures which may range from about 50 atmospheres to 4000 atmospheres or higher.

*Example II*

Seven feet of ⅛" nickel tubing shaped in the form of a helix was heated to 900° C. with nitrogen gas passing through it. Gaseous thionyl tetrafluoride (4 parts) was then passed through the heated tube at a rate of about 10 ml. per minute. The effluent gases were condensed in a U-shaped trap cooled in solid carbon dioxide-ether mixture. The condensate was shown by mass spectrometric analysis to be 46 mole percent of sulfur hexafluoride, 47 mole percent of sulfuryl fluoride, and 7 mole percent of unreacted thionyl tetrafluoride.

Example II illustrates the pyrolysis of thionyl tetrafluoride by a continuous process. Separation of the reactants can be accomplished by fractional distillation. Operation of the continuous process at a temperature higher than 900° C., for example, 1200° C. reduced the quantity of unreacted thionyl tetrafluoride. The continuous process can be operated at superatmospheric pressure, for example, from about 5 to about 50 atmospheres, to give high yields of sulfur hexafluoride and sulfuryl fluoride at temperatures as low as 450° C. The continuous process can be operated at reduced pressure, for example, 100 mm., but, at this pressure, a temperature of 1000° C. or above is preferably employed.

I claim:

1. In the production of sulfur hexafluoride and sulfuryl fluoride, the step which comprises pyrolyzing thionyl tetrafluoride at a temperature of at least about 450° C. and under substantially anhydrous conditions to avoid side reactions which occur with water.

2. In the production of sulfur hexafluoride and sulfuryl fluoride, the step which comprises passing thionyl tetrafluoride through a reaction zone heated at a temperature of at least about 450° C. and under substantially anhydrous conditions to avoid side reactions which occur with water.

3. The process which comprises (1) pyrolyzing thionyl tetrafluoride at a temperature of at least about 450° C. and under substantially anhydrous conditions to avoid side reactions which occur with water, and (2) subsequently separating at least one member of the group consisting of sulfur hexafluoride and sulfuryl fluoride from the pyrolyzed product.

4. The process which comprises (1) passing thionyl tetrafluoride through a reaction zone heated at a temperature of at least about 450° C. and under substantially anhydrous conditions to avoid side reactions which occur with water, and (2) subsequently separating at least one member of the group consisting of sulfur hexafluoride and sulfuryl fluoride from the heated product.

References Cited in the file of this patent

UNITED STATES PATENTS 2,801,904    Muetterties _____ Aug. 6, 1957